(12) United States Patent
Brandt et al.

(10) Patent No.: US 10,083,124 B1
(45) Date of Patent: Sep. 25, 2018

(54) TRANSLATING VIRTUAL MEMORY ADDRESSES TO PHYSICAL ADDRESSES

(71) Applicant: INTERNATIONAL BUSINESS MACHINES CORPORATION, Armonk, NY (US)

(72) Inventors: Uwe Brandt, Boeblingen (DE); Markus Helms, Boeblingen (DE); Christian Jacobi, Poughkeepsie, NY (US); Markus Kaltenbach, Boeblingen (DE); Thomas Koehler, Boeblingen (DE); Frank Lehnert, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/465,763

(22) Filed: Mar. 22, 2017

(51) Int. Cl.
*G06F 12/10* (2016.01)
*G06F 12/1009* (2016.01)
*G06F 12/0875* (2016.01)

(52) U.S. Cl.
CPC ...... *G06F 12/1009* (2013.01); *G06F 12/0875* (2013.01); *G06F 2212/452* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 7,793,069 B2 | 9/2010 | Hilton | |
| 8,127,082 B2 | 2/2012 | McBride et al. | |
| 8,301,865 B2 | 10/2012 | Grohoski et al. | |
| 9,244,856 B2 | 2/2016 | Greiner et al. | |
| 2015/0178220 A1 | 6/2015 | Grubisic et al. | |
| 2016/0085688 A1 | 3/2016 | Franko | |

OTHER PUBLICATIONS

Austin, Todd M. et al., "High-Bandwidth Address Translation for Multiple-Issue Processors," May 1996, pp. 1-2 (abstract only).
Xiaogang Qiu, M. Dubois et al., "Options for Dynamic Address Translation in Comas," Aug. 2002, pp. 1-3 (abstract only).

*Primary Examiner* — Kevin Verbrugge
(74) *Attorney, Agent, or Firm* — William A. Kinnaman, Esq.; Kevin P. Radigan, Esq.; Heslin Rothenberg Farley & Mesiti P.C.

(57) ABSTRACT

A translation engine for a processor system to translate virtual memory addresses to physical addresses of a main memory of a computer system is provided, where a sequence of accesses to multiple address translation tables is performed to support a computer system virtualization level. The translation engine includes: a first pipeline having at least, a first pipeline stage to receive a value for an original address or an address translation table entry requested in a previous pass through the first pipeline; a second pipeline stage using the value as an operand in a translation operation eventually yielding the address translation result or yielding a table index to an entry in a next address translation table; and a third pipeline stage issuing a read request for the entry in the next address translation table.

20 Claims, 5 Drawing Sheets

TRANSLATING VIRTUAL MEMORY ADDRESSES TO PHYSICAL ADDRESSES

BACKGROUND

The present invention relates in general to data processing systems, and in particular, to a translation engine, a method for a processor system to translate virtual memory addresses to physical addresses of a main memory of a computer system as well as to a computer program product and a data processing system.

Dynamic address translation provides the ability to interrupt the execution of a program at an arbitrary moment, record it and its data in auxiliary storage, such as a direct access storage device, and at a later time return the program and the data to different main storage locations for resumption of execution. The transfer of the program and its data between main and auxiliary storage may be performed piecemeal, and the return of the information to main storage may take place in response to an attempt by the CPU to access it at the time it is needed for execution. These functions may be performed without change or inspection of the program and its data, do not require any explicit programming convention in the relocated program, and do not disturb the execution of the program except for the time delay involved.

With appropriate support by an operating system, the dynamic address translation facility may be used to provide to a user a system wherein storage appears to be larger than the main storage which is available in the configuration. This apparent main storage is often referred to as virtual storage, and the addresses used to designate locations in the virtual storage are often referred to as virtual addresses. The virtual storage of a user may far exceed the size of the main storage which is available in the configuration and normally is maintained in auxiliary storage. The virtual storage is considered to include blocks of data, commonly called pages (also referred to as segments and regions). Only the most recently referred to pages of the virtual storage are assigned to occupy blocks of physical main storage. As the user refers to pages of virtual storage that do not appear in main storage, they are brought in to replace pages in main storage that are less likely to be needed. In some cases, virtual storage is assigned to main storage for a long period of time (or permanently), regardless of whether the storage is referenced. The swapping of pages of storage may be performed by the operating system without the user's knowledge.

Programs use addresses (or virtual addresses) to access virtual storage. The program may fetch instructions from virtual storage or load data or store data from virtual storage using virtual addresses. The virtual addresses associated with a range of virtual storage define an address space. With appropriate support by an operating system, the dynamic address translation facility may be used to provide a number of address spaces. These address spaces may be used to provide degrees of isolation between users. Such support can consist of completely different address space for each user, thus providing complete isolation, or a shared area may be provided by mapping a portion of each address space to a single common storage area. Also, instructions are provided which permit a semi-privileged program to access more than one such address space.

Dynamic address translation provides for the translation of virtual addresses from multiple different address spaces. These address spaces are called primary address space, secondary address space, and access register specified address spaces. A privileged program can also cause the home address space to be accessed. Dynamic address translation may be specified for instruction and data addresses generated by the CPU.

SUMMARY

Shortcomings of the prior art are overcome and additional advantages are provided through the provision of a translation engine for a processor system to translate virtual memory addresses to physical addresses of a main memory of a computer system, wherein a sequence of accesses to multiple address translation tables is performed to support a computer system virtualization level. The translation engine includes a first pipeline, and is configured to perform a method, including receiving by a first pipeline stage a value for an original address or an address translation table entry requested in a previous pass through the first pipeline, and using the value by a second pipeline stage as an operand in a translation operation, eventually yielding the address translation result, or yielding a table index to an entry in a next address translation table. Further, the method includes issuing a read request by a third pipeline stage for the entry in the next address translation table.

Methods and computer program products relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The present invention together with the above-mentioned and other objects and advantages may best be understood from the following detailed description of the depicted embodiments, but not restricted to the depicted embodiments, wherein.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments provide a translation engine for a processor system to translate virtual memory addresses to physical addresses of a main memory of a computer system, wherein a sequence of accesses to multiple address translation tables is performed to support a computer system virtualization level, including or characterized by, a first pipeline.

The illustrative embodiments are sometimes described herein using particular technologies only as an example for the clarity of the description. The illustrative embodiments may be used for a translation engine, including a first pipeline including at least, (i) a first pipeline stage to receive a value either for an original address or an address translation table entry requested in the previous pass through the pipeline; (ii) a second pipeline stage using the value as an operand in a translation operation eventually yielding the address translation result or yielding a table index to the entry in the next address translation table; and (iii) a third pipeline stage issuing the read request for the entry in the next address translation table.

The one or more embodiments may be based on a multi-threaded processor subsystem (CPU) with a translation engine for address translation (XU). The architecture of this processor subsystem includes a variety of addressing modes and related translation operations like Dynamic Address Translation (DAT) as depicted in FIG. 1, Access Register Translation (ART), Memory Relocation, Prefixing.

Figure 1:
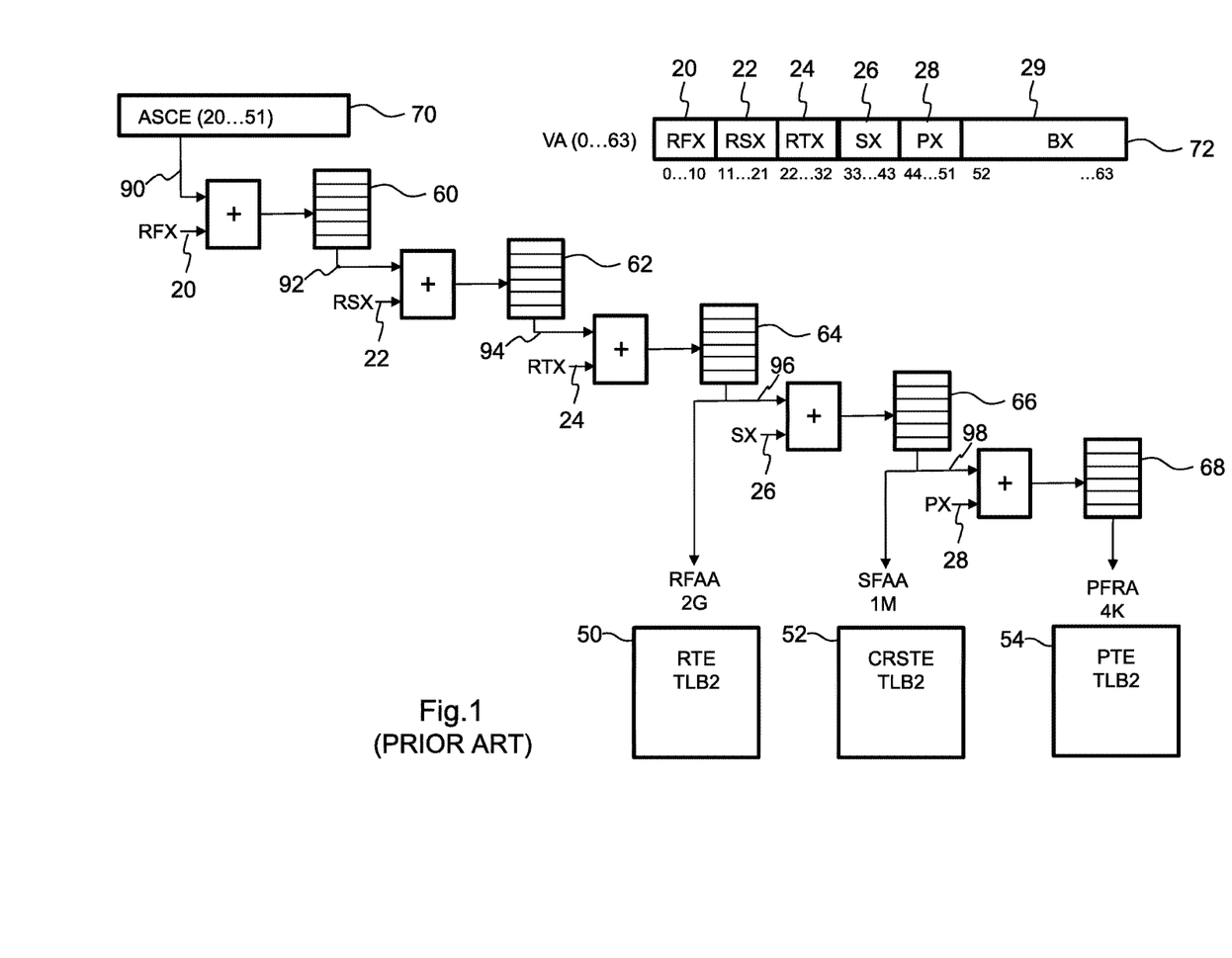
FIG. 1 depicts a scheme for dynamic address translation of virtual memory addresses to physical addresses according to the state of the art.

FIG. 1 depicts a scheme for dynamic address translation of virtual memory addresses to physical addresses according to the state of the art.

In general, each translation step starts with a Table Origin Address (TO) 90, 92, 94, 96, 98 and a Table Index (TX) 20, 22, 24, 26, 28 of a virtual address 72. First a prefix operation is applied on TO 90, 92, 94, 96, 98, and then the TX 20, 22, 24, 26, 28 and a Memory Relocation Origin are added to the TO 90, 92, 94, 96, 98. The result of these operations is either the final translation result or is used as memory address to fetch the TO 92, 94, 96, 98 of the next level of Address Translation Tables (ATTs) 60, 62, 64, 66, 68. The translation tables 60, 62, 64, 66, 68 reside in the cache/memory hierarchy and table fetch latencies depend on which level of this hierarchy the respective table entry actually exists. This cache/memory hierarchy for table fetches is referred to in the following as Table Cache. The table cache can be efficiently implemented through the instruction cache infrastructure, which from its nature is also a fetch-only cache.

The translation process is controlled by thread dependent processor state information, an address space origin (the initial TO), referred to as address space control element (ASCE) 70. Further the translation process is, e.g., controlled by a logical address (LA), a prefix register, a memory relocation origin, an architecture mode, a virtualization level (virtualization mode, Host/Guest-1/Guest-2), and an operation type (DAT, ART, . . . ).

In FIG. 1 the address translation process is started by adding a table index region first index (RFX) 20 to the ASCE 70 as a table origin address 90 to enter the first address translation table (ATT) 60, which delivers the next TO 92, where a table index region second index (RSX) 22 is added to, resulting in an entry to the next ATT 62. This delivers a TO 94, where a table index region third index (RTX) 24 is added to, resulting in an entry to the next ATT 64. This results in a TO 96, which may also be used as a region frame absolute address (RFAA) in order to be stored as a region table entry (RTE) in the translation lookaside buffer 50. A segment index (SX) 26 is added to the TO 96 resulting in an entry to the next ATT 66, which delivers a TO 98, which may also be used as a segment frame absolute address (SFAA) in order to be stored as a combined region and segment table entry (CRSTE) in the translation lookaside buffer 52. A page index (PX) 28 is added to the TO 98 resulting in an entry to the next ATT 68, which delivers a page frame real address (PFRA) to be stored as page table entry (PTE) in the translation lookaside buffer 54.

When the CPU is executing instructions, address translation requests for instruction addresses as well as operand addresses may be issued simultaneously for multiple threads, causing them to queue up waiting to be processed by the translation engine. A state-of-the-art address translation engine can only process one request at a time and needs to complete this request first, before accepting the next request. This results in low translation throughput and high queuing latencies.

In one or more aspects, disclosed herein is a pipelined implementation of the translation engine and how this translation pipeline can be operated closely associated with the pipeline of the table cache. This allows multiple translation requests being processed simultaneously in different stages of the translation engine pipeline.

Each translation request is represented by its complete state information. Additional information is added to this state information describing in which step of the translation process the respective translation request currently is located.

The translation process is mapped to the translation pipeline stages as is shown in the following Table 1, which shows pipeline stages of the first pipeline (reference signs refer to FIGS. 2 to 4):

TABLE 1

Figure 2:
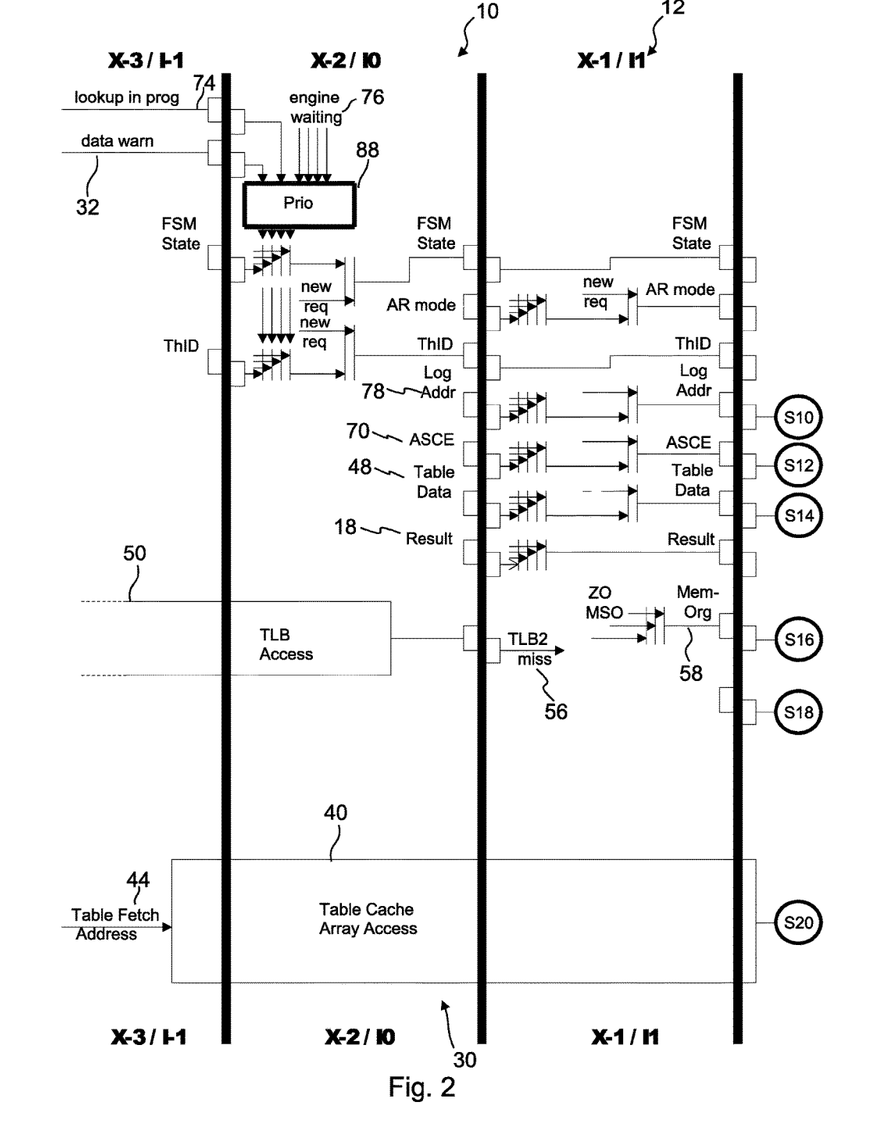
FIG. 2 depicts the first three stages of an interleaved operation of an address translation pipeline and a table cache pipeline, according to one or more aspects of the present invention.
Figure 3:
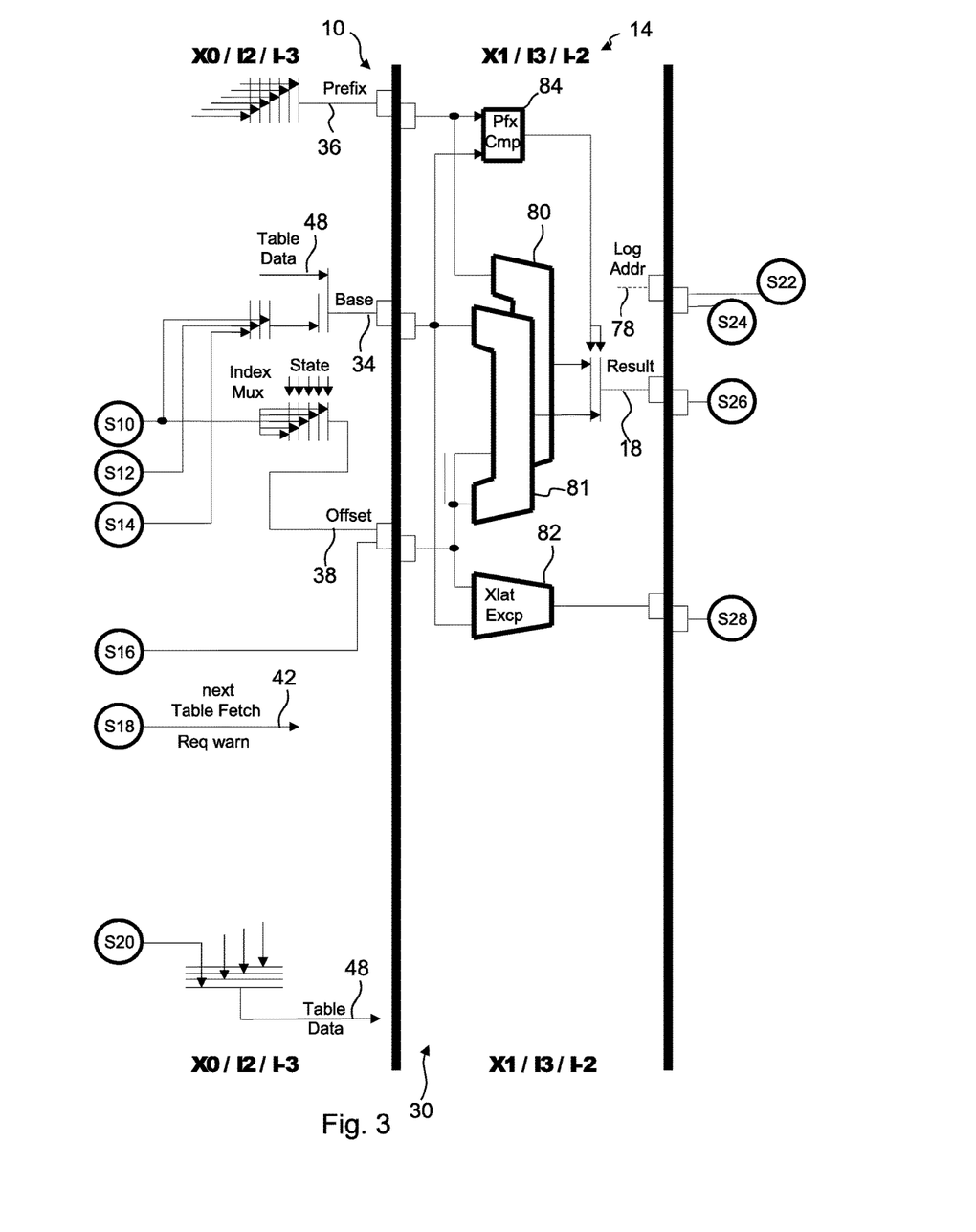
FIG. 3 depicts the two stages of an interleaved operation of an address translation pipeline and a table cache pipeline following after the stages described in FIG. 2, according to one or more aspects of the present invention.
Figure 4:
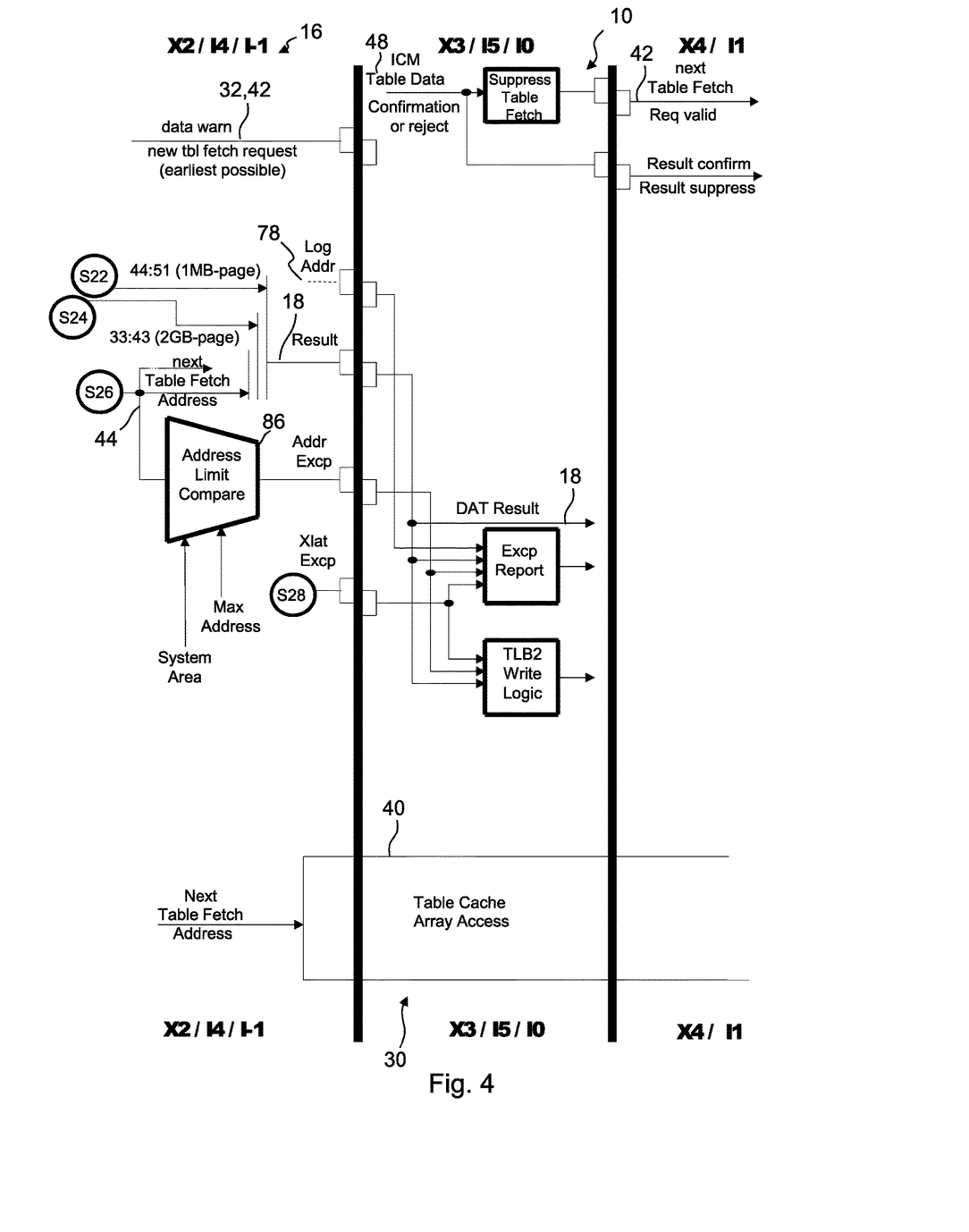
FIG. 4 depicts the last three stages of an interleaved operation of an address translation pipeline and a table cache pipeline following the stages described in FIG. 3, according to one or more aspects of the present invention.

| Pipeline Stage | Function |
| --- | --- |
| X-3 | New translation request or data warning 32 from the table cache 40 received to initiate next pipeline run. |
| X-2 | Priority cycle, select request with highest priority to occupy current pipeline stage: data warning 32 from the table cache 40 has always highest priority. Next highest priority is assigned to engines currently waiting for an empty pipeline stage, independent from data warning 32 (wait state). Lowest priority is for new requests just been received in X-3. If such a request cannot get priority right away, it enters the wait state. |
| X-1 | Select engine state for current pipeline run and gate into the pipeline 10. |
| X0 | Functional multiplexing (table index 20, . . . , 29 and offset 38, relocation origin 34, prefix 36 . . . ). |
| X1 | Prefixing, TO/TX addition, relocation addition. |
| X2 | Testing result address 18 for addressing exceptions and sending next table fetch address to table cache 40. |
| X3 | Sending unconfirmed result 18 to a translation lookaside buffer 50, 52, 54. |
| X4 | Result confirmation, based on table data confirmation/reject in X3. |

Advantageously, in one or more embodiments, a translation engine as disclosed herein is able to simultaneously maintain up to four translation requests. Each translation request is fully represented by its state information, as described above. An address translation, e.g., for a single virtualization level may require up to five table fetches, each table fetch requiring one additional pipeline run. The pipeline approach disclosed allows the engine to initiate a new pipeline run every cycle for a different request. So up to four requests may be running through the pipeline simultaneously in different stages of the pipeline.

FIG. 2 depicts the first three stages of an interleaved operation of an address translation pipeline 10 and a table cache pipeline 30 according to an embodiment of the present invention, whereas FIG. 3 depicts the following two stages and FIG. 4 the last three stages of the interleaved operation. The first pipeline 10 is depicted in the upper part of the FIGS. 2 to 4, whereas the second pipeline is depicted in the lower part of the FIGS. 2 to 4.

The pipeline stages are distributed over the three FIGS. 2 to 4, where the signals connecting the pipeline stages X-1/I1 in FIG. 2 to the pipeline stages X0/I2/I-3 in FIG. 3 are marked by S10 to S20. The signals connecting the pipeline stages X1/I3/I-2 in FIG. 3 to the pipeline stages X2/I4/I-1 in FIG. 4 are marked by S22 to S28.

In one or more embodiments, the translation engine is for a processor system 216 to translate virtual memory addresses to physical addresses of a main memory 230 of a computer system 212, wherein a sequence of accesses to multiple address translation tables 60, 62, 64, 66, 68 is performed to support a computer system virtualization level. The translation engine includes the first pipeline 10 including at least, (i) a first pipeline stage 12 to receive a value either for an original address or an address translation table entry requested in the previous pass through the pipeline 10; (ii) a second pipeline stage 14 using the value as an operand in a translation operation eventually yielding the address translation result 18 or yielding a table index 20, 22, 24, 26, 28 to the entry in the next address translation table 60, 62, 64, 66, 68; and (iii) a third pipeline stage 16 issuing the read request for the entry in the next address translation table 60, 62, 64, 66, 68.

FIGS. 2 to 4 show how the address translation pipeline 10 may be closely interconnected with the pipeline 30 of the table cache 40. The stages of the address translation pipeline 10 are designated with X-numbers, while the stages of the table cache pipeline 30 are designated with I-numbers. The first one of the I-numbers represent a table fetch returning result data 18 for the current translation pipeline run, while the second one of the I-numbers represent the request address 44 and parameters being calculated by the translation pipeline 10 for the next table fetch request 42.

A table index 20, 22, 24, 26, 28 and an address translation table 60, 62, 64, 66, 68 may refer to the approach shown in FIG. 1. The first pipeline stage 12 may be represented in FIG. 2 as the stage X-1 of the first pipeline 10, whereas the second pipeline stage 14 may be represented as the stage X1, shown in FIG. 3 and the third pipeline stage 16 as the stage X2, shown in FIG. 4.

Address translation is being performed by an interleaved operation of the first pipeline 10 with the second pipeline 30 of a table cache 40 as exemplified in FIGS. 2 to 4.

The first pipeline 10 includes at least the stages (i) receiving a new translation request or a data warning from the table cache 40 to initiate the next pipeline run (stage X-3 in FIG. 2); (ii) selecting a request with highest priority to occupy the current pipeline stage (stage X-2 in FIG. 2); (iii) selecting a state for current pipeline run and a gate into the pipeline 10 (stage X-1 in FIG. 2); (iv) performing functional multiplexing (stage X0 in FIG. 3); (v) performing at least one of prefixing, addition of a table origin address 90, 92,94, 96, 98 and/or a table index 20, 22, 24, 26, 28, addition of a relocation address 34 (stage X1 in FIG. 3); (vi) checking the address translation result 18 for addressing exceptions (stage X2 in FIG. 4); (vii) sending an unconfirmed address translation result 18 to a translation lookaside buffer 50, 52, 54 (stage X3 in FIG. 4); and (viii) confirming the address translation result 18, based on a table data confirmation or rejection (stage X4 in FIG. 4).

The table cache 40, which may be implemented in an instruction cache of the processor system 216, includes the following pipeline stages, which are described generally in the following Table 2, and which shows pipeline stages of the second pipeline 30 of the table cache 40:

TABLE 2

| Pipeline Stage | Function |
| --- | --- |
| I-3 | Early indication received from the translation pipeline 10 in order to reserve a pipeline stage for a new table fetch request: a request warning is issued. |
| I-2 | ... |
| I-1 | table fetch address 44 received for new table fetch request 42.<br>earliest possible data warning 32 sent to the translation pipeline 10 to start new pipeline run in order to be prepared for potential table fetch data return in I2. |
| I0 ... I1 | table cache directory and array access |
| I2 | final selection of table fetch result data 18.<br>Sending result data 18 to the translation pipeline 10. |
| I3 ... I4 | ... |
| I5 | confirmation or reject of result data 18 received in I3.<br>In case of a reject the translation pipeline 10 will ignore the result data 18 and wait for the next data warning 32. |

The translation engine may be configured such that a data warning 32 from the table cache 40 has highest priority. A translation request for an empty pipeline stage has next highest priority, independent from a data warning 32 and a new translation request has lowest priority. The new translation request may enter a wait state, if there is no free pipeline stage.

Thus the second pipeline 30 of the table cache 40 includes at least the stages (i) receiving an early indication from the first pipeline 10 for reserving a pipeline stage for a new table fetch request 42 (stage I-3 in FIG. 3); (ii) receiving a table fetch address 44 for the new table fetch request 42 (stage I-1 in FIGS. 2 and 4); (iii) sending a data warning 32 to the first pipeline 10 to start a new pipeline run in order to be prepared for a potential table fetch data return (stage I-1 in FIGS. 2 and 4); (iv) accessing a table cache directory and array (stages I0, I1 in FIGS. 2 and 4); (v) selecting the table fetch address translation result 18 and sending the address translation result 18 to the first pipeline 10 (stage I2 in FIG. 3); (vi) confirming or rejecting the received address translation result 18 (stage I5 in FIG. 4); and (vii) in case of rejection ignoring the address translation result 18 and waiting for the next data warning 32 (stage I5 in FIG. 4).

As part of the interleaved operation of the translation pipeline 10 and the table cache pipeline 30, the second pipeline 30 of the table cache 40 may be configured for parallel operation of (v) selecting the table fetch address translation result 18 and sending the address translation result 18 to the first pipeline 10; and (i) receiving an early indication from the first pipeline 10 for reserving a pipeline stage for a new table fetch request 42, as is exemplified in FIG. 3. Further the second pipeline 30 of the table cache 40 may be configured for parallel operation of (vi) confirming or rejecting the received address translation result 18; and (iv) accessing a table cache directory and array 46, as is exemplified in FIG. 4.

As shown in FIG. 2, in the pipeline stage X-3/I-1 there is a lookup in progress 74, starting the first pipeline 10, a data warning 32 is received and a table fetch address 44 is sent to the table cache 40 for a table cache array access in the next stage.

In the pipeline stage X-2/I0, prioritizing is performed in the priority module 88 with input from lookup in progress 74, data warning 32 and engine waiting signal 76, selecting the new request with the highest priority. A translation lookaside buffer 50 is accessed. A result 18 may be transferred to the next stage. Table data 48, a log address 78, as well as the address space control element (ASCE) 70 are fed to the next pipeline stage.

The pipeline stage X-1/I1 functions as a transfer cycle for the new requests, where the table cache directory and array access continues. A translation engine state may be selected for the current pipeline run, where the engine state relates to the parameters of the requests 42 as well as the state of the requests 42. If there is a TLB miss signal 56, meaning that a result 18 in the TLB 50 is not valid, translation of a new address may be performed. A memory origin 58 may be fed for addition to the address data in the next stage.

In the pipeline stage X0/I2/I-3 the functional multiplexing is performed for a final selection of the table fetch result data in stage 12 of the table cache pipeline 30. A new table cache pipeline cycle I-3 may be started with the next table fetch request warning 42, even if the previous result 18 is not yet confirmed as valid.

In the next stage X1/I3/I-2, which is mainly an active stage of the first pipeline 10, two adder results are calculated in parallel by the adders 80, 81. The table index values as well as relocation addresses 34 are added to the table origin data in the adder modules 80, 81 delivering a result 18. One result is based on a prefix hit (adder 80) and the other one on prefix nohit (adder 81). Finally, dependent on the outcome of the prefix compare, the appropriate adder result 18 is selected (based on prefix hit or nohit). This allows to do the addition and the prefix compare in parallel. This is necessary in order to perform prefix compare and addition in the same cycle. Otherwise an additional cycle would be required for prefix compare. The prefixing compare is performed in the prefix compare module 84, where the prefix 36 is input in the previous stage. Excepting testing is performed in the translation exception module 82.

In the pipeline stage X2/I4/I-1 testing the result address is continued by the address limit compare module 86 for the next table fetch address 44. A data warning 32 is issued. The data warning 32 is received from the table cache 40 and starts a new translation engine pipeline run. This data warning 32 is the earliest possible based on the request warning 42 sent by the translation pipeline in X0. A table fetch address is received for a new table fetch request 42 in the table cache pipeline 30.

In the next pipeline stage X3/I5/I0 the unconfirmed result 18 of the dynamic address translation (DAT) process is sent to the translation lookaside buffer 50, 52, 54. The table cache array access with the new table fetch address is continued.

Instruction cache module (ICM) table data 48 are confirmed or rejected to deliver a result 18 confirmed or rejected for the next pipeline stage X4/I1. If the result 18 for the previous request 42 is rejected, then the result 18 for the new request 42 may also be invalid. Thus, the request 42 may be repeated in a new pipeline cycle. A next table fetch request 42 valid may be set as well for the new table cache pipeline stage I1. Thus, a complete pipeline run of the translation pipeline 10 may be closed and the pipeline may start a new run.

FIGS. 2 to 4 show further, that the minimum table fetch latency for a given request is five cycles. This is the minimum delay from launching a table fetch request 44 until launching the next table fetch request 44 based on the return data of the first table fetch request 44. This minimum latency may be achieved, if the table fetch hits in the table cache. In this case, a data warning 32 will be sent in I-1 already 2 cycles after a request warning. This data warning 32 is followed by valid data in I2 and confirmation in I5.

A data warning 32 is always followed by table data return three cycles later and confirmation or reject six cycles later, dependent on whether or not the table data received has been valid.

If the table fetch request 42 does not hit in the table cache 40, then the data warning 32 may occur later than I-1 and the return data may probably not be valid, causing "reject" to be activated rather than "confirmation". In case of "reject" the received table data 48 from this pipeline run is just ignored and the pipeline run is repeated by the table cache 40 sending another data warning any time later, when the respective data has become available through the cache/memory hierarchy.

For each new pipeline stage a priority scheme is applied in stage X-2 of the first pipeline in order to assign this pipeline stage to any of the pending requests waiting to perform the next pipeline run. The pipeline stage is assigned with highest priority to a request, just having received the data warning. In a given cycle, the data warning is possible for only one out of the up to four pending requests. Therefore, priority among multiple requests works quite natural. If no data warning is active, the respective pipeline stage will be assigned to any request currently in a wait state. Requests enter the wait state, if they cannot obtain a free pipeline stage for their initial pipeline run, just when they have been received. If a new request is received and there is no data warning currently active for any translation engine nor is any request in a wait state, then this new request will occupy the current pipeline stage right away.

The close interconnection of the first address translation pipeline 10 and the second table cache pipeline 30 allows to perform the table cache array access interleaved with the state selection and functional multiplexing of the address translation. By this the amount of serialization is substantially reduced. As can be seen in FIGS. 2 to 4, the only translation pipeline stage not interleaved with the table cache access is finally the adder stage X1, shown in FIG. 3, which in turn forces serialization for conceptual reasons, as the adder input is based on the table cache fetch data, while the table cache fetch address is directly derived from the adder output.

So, this embodiment of a translation engine reduces latency by interleaving operations as much as possible and increases throughput as well, allowing to have every pipeline stage simultaneously working on a different translation request.

Those skilled in the art will note from the above description that a translation engine is disclosed herein for a processor system to translate virtual memory addresses to physical addresses of a main memory of a computer system, wherein a sequence of accesses to multiple address translation tables is performed to support a computer system virtualization level. The translation engine includes a first pipeline, and includes at least, (i) a first pipeline stage to receive a value either for an original address or an address translation table entry requested in the previous pass through the pipeline; (ii) a second pipeline stage using the value as an operand in a translation operation eventually yielding the address translation result or yielding a table index to the entry in the next address translation table; and (iii) a third pipeline stage issuing the read request for the entry in the next address translation table.

Further a method is disclosed herein for translating virtual memory addresses to physical addresses in a processor system with a translation engine, including a first pipeline. The method includes at least, (i) receiving by a first pipeline stage a value either for an original address or an address translation table entry requested in the previous pass through the first pipeline; (ii) using the value by a second pipeline stage as an operand in a translation operation eventually yielding the address translation result or yielding a table index to the entry in the next address translation table; and (iii) issuing the read request by a third pipeline stage for the entry in the next address translation table.

Further a computer program product is disclosed herein for translating virtual memory addresses to physical addresses in a processor system with a translation engine, including a first pipeline, the computer program product including a computer readable storage medium having program instructions embodied therewith, the program instructions executable by the computer to cause the computer to perform a method including at least, (i) receiving by a first pipeline stage a value either for an original address or an address translation table entry requested in the previous pass through the pipeline; (ii) using the value by a second pipeline stage as an operand in a translation operation eventually yielding the address translation result or yielding a table index to the entry in the next address translation table; and (iii) issuing the read request by a third pipeline stage for the entry in the next address translation table.

Further, a data processing system for execution of a data processing program is disclosed herein, including computer readable program instructions for performing the method described above.

Figure 5:
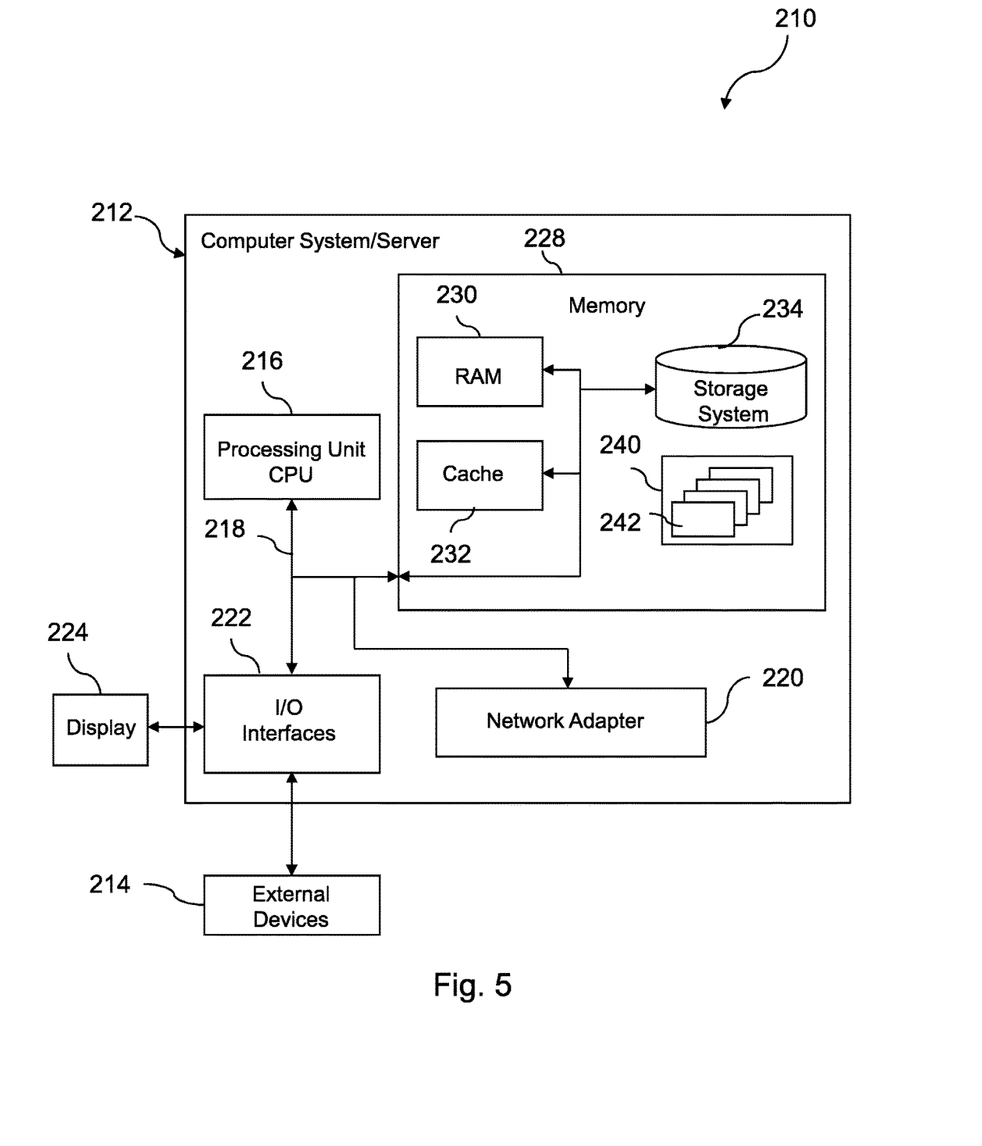
FIG. 5 depicts an example embodiment of a data processing system for executing a method according to one or more aspects of the present invention.

Referring now to FIG. 5, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that, although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A translation engine for a processor system to translate virtual memory addresses to physical addresses of a main memory of a computer system, wherein a sequence of accesses to multiple address translation tables is performed to support a computer system virtualization level, and wherein the translation engine includes a first pipeline and is configured to perform a method comprising:
   receiving by a first pipeline stage a value for an original address or an address translation table entry requested in a previous pass through the first pipeline;
   using the value by a second pipeline stage as an operand in a translation operation eventually yielding the address translation result or yielding a table index to an entry in a next address translation table; and
   issuing a read request by a third pipeline stage for the entry in the next address translation table.

2. The translation engine according to claim 1, wherein address translation is performed by an interleaved operation of the first pipeline with a second pipeline of a table cache.

3. The translation engine according to claim 2, wherein the translation engine further performs:
   receiving a new translation request or a data warning from the table cache to initiate a next pipeline run;
   selecting a request with highest priority to occupy the current pipeline stage;
   selecting a state for current pipeline run and a gate into the pipeline;
   performing functional multiplexing;
   performing at least one of prefixing, addition of a table origin address or a table index, or addition of a relocation address;
   checking the address translation result for addressing exceptions;
   sending an unconfirmed address translation result to a translation lookaside buffer; and
   confirming the address translation result, based on a table data confirmation or rejection.

4. The translation engine according to claim 3, wherein the translation engine is further configured such that a data warning from the table cache has highest priority.

5. The translation engine according to claim 4, wherein the translation engine is further configured such that a translation request for an empty pipeline stage has next highest priority, independent from a data warning.

6. The translation engine according to claim 5, wherein the translation engine is further configured such that a new translation request has lowest priority.

7. The translation engine according to claim 6, wherein the translation engine is further configured such that the new translation request enters a wait state based on there being no free pipeline stage.

8. The translation engine according to claim 2, wherein the second pipeline of the table cache further performs:
   receiving an early indication from the first pipeline for reserving a pipeline stage for a new table fetch request;
   receiving a table fetch address for the new table fetch request;
   sending a data warning to the first pipeline to start a new pipeline run in order to be prepared for a potential table fetch data return;
   accessing a table cache directory and array;
   selecting the table fetch address translation result and sending the address translation result to the first pipeline;
   confirming or rejecting the received address translation result; and
   in case of rejection, ignoring the address translation result and waiting for the next data warning.

9. The translation engine according to claim 8, wherein the second pipeline of the table cache is configured for parallel operation of:
   selecting the table fetch address translation result and sending the address translation result to the first pipeline; and
   receiving an early indication from the first pipeline for reserving a pipeline stage for a new table fetch request.

10. The translation engine according to claim 8, wherein the second pipeline of the table is being configured for parallel operation of:
   confirming or rejecting the received address translation result; and
   accessing a table cache directory and array.

11. The translation engine according to claim 2, where the table cache is implemented in an instruction cache of the processor system.

12. A method for translating virtual memory addresses to physical addresses in a processor system with a translation engine having a first pipeline, the method comprising:
   receiving by a first pipeline stage a value for an original address or an address translation table entry requested in a previous pass through the first pipeline;
   using the value by a second pipeline stage as an operand in a translation operation eventually yielding the address translation result or yielding a table index to an entry in a next address translation table; and
   issuing the read request by a third pipeline stage for the entry in the next address translation table.

13. The method according to claim 12, further comprising performing the address translation by an interleaved operation of the first pipeline with a second pipeline of a table cache.

14. The method according to claim 12, wherein the method further comprises, at least in the first pipeline stage:
   receiving a new translation request or a data warning from the table cache to initiate a next pipeline run;
   selecting a request with highest priority to occupy a current pipeline stage;
   selecting a state for the current pipeline run and a gate into the first pipeline;
   performing functional multiplexing;
   performing at least one of prefixing, addition of a table origin address or a table index, or addition of a relocation address;
   checking the address translation result for addressing exceptions;
   sending an unconfirmed address translation result to a translation lookaside buffer; and
   confirming the address translation result, based on a table data confirmation or rejection.

15. The method according to claim 12, wherein the translating is performed by an interleaved operation of the first pipeline and a second pipeline of a table cache, the second pipeline performing:
- receiving an early indication from the first pipeline for reserving a pipeline stage for a new table fetch request;
- receiving a table fetch address for a new table fetch request;
- sending a data warning to the first pipeline to start a new pipeline run in order to be prepared for a potential table fetch data return;
- accessing a table cache directory and array;
- selecting the table fetch address translation result and sending the address translation result to the first pipeline;
- confirming or rejecting the received address translation result; and
- in case of rejection, ignoring the address translation result and waiting for the next data warning.

16. The method according to claim 15, wherein the second pipeline of the table cache comprises a parallel operation of:
- selecting the table fetch address translation result and sending the address translation result to the first pipeline; and
- receiving an early indication from the first pipeline for reserving a pipeline stage for a new table fetch request.

17. The method according to claim 12, wherein the second pipeline of the table cache comprises a parallel operation of:
- confirming or rejecting the received address translation result; and
- accessing a table cache directory and array.

18. A computer program product for translating virtual memory addresses to physical addresses in a processor system with a translation engine including a first pipeline, the computer program product comprising:
- a computer readable storage medium having program instructions embodied therewith, the program instructions being executable by a processor to cause the processor to perform a method comprising:
  - receiving by a first pipeline stage a value for an original address or an address translation table entry requested in a previous pass through the first pipeline;
  - using the value by a second pipeline stage as an operand in a translation operation eventually yielding the address translation result or yielding a table index to an entry in a next address translation table; and
  - issuing a read request by a third pipeline stage for the entry in the next address translation table.

19. The computer program product of claim 18, further comprising performing the address translation by an interleaved operation of the first pipeline with a second pipeline of a table cache.

20. The computer program product of claim 18, wherein the second pipeline of the table cache further performs:
- receiving an early indication from the first pipeline for reserving a pipeline stage for a new table fetch request;
- receiving a table fetch address for the new table fetch request;
- sending a data warning to the first pipeline to start a new pipeline run in order to be prepared for a potential table fetch data return;
- accessing a table cache directory and array;
- selecting the table fetch address translation result and sending the address translation result to the first pipeline;
- confirming or rejecting the received address translation result; and
- in case of rejection, ignoring the address translation result and waiting for the next data warning.

* * * * *